United States Patent
Powell et al.

(10) Patent No.: US 6,606,868 B1
(45) Date of Patent: Aug. 19, 2003

(54) R 22 REPLACEMENT REFRIGERANT

(75) Inventors: Richard L. Powell, Cheshire (GB);
John Edward Poole, Cheshire (GB);
John Derek Capper, Cheshire (GB);
James Victor Thomas, Nova Scotia (GB)

(73) Assignee: Refrigerant Products, Ltd., Manchester (GB)

( * ) Notice: Subject to any disclaimer, the term of this patent is extended or adjusted under 35 U.S.C. 154(b) by 121 days.

(21) Appl. No.: 09/677,948

(22) Filed: Oct. 2, 2000

Related U.S. Application Data (63) Continuation-in-part of application No. 09/564,063, filed on May 3, 2000, now abandoned.
(60) Provisional application No. 60/157,692, filed on Oct. 4, 1999.

(51) Int. Cl.[7] .............................................. F25D 25/00
(52) U.S. Cl. ................................ 62/114; 62/114; 252/68
(58) Field of Search ............................... 252/68; 62/114

(56) References Cited

U.S. PATENT DOCUMENTS

| | | | |
|---|---|---|---|
| 4,138,855 A | 2/1979 | Jahan et al. | 62/112 |
| 4,198,313 A | 4/1980 | Bargigia et al. | 252/305 |
| 4,272,960 A | 6/1981 | Wahl, III | 60/641 D |
| 4,482,465 A | 11/1984 | Gray | 252/67 |
| 4,810,403 A | 3/1989 | Bivens et al. | 252/67 |
| 4,941,986 A | 7/1990 | Jolly | 252/51.5 R |
| 4,944,890 A | 7/1990 | Deeb et al. | 252/54 |
| 5,026,497 A | 6/1991 | Merchant | 252/171 |
| 5,080,823 A | 1/1992 | Arnaud et al. | 252/172 |
| 5,108,637 A | 4/1992 | Pearson | 252/67 |
| 5,182,040 A | 1/1993 | Bartlett et al. | 252/67 |
| 5,304,320 A | 4/1994 | Barthelemy et al. | 252/67 |
| 5,360,566 A | 11/1994 | Stevenson | 252/67 |
| 5,370,812 A | 12/1994 | Brown | 252/68 |
| 5,417,871 A | 5/1995 | Minor et al. | 252/67 |
| 5,425,890 A | 6/1995 | Yudin et al. | 252/67 |
| 5,458,798 A | 10/1995 | Lunger et al. | 252/67 |
| 5,622,644 A | 4/1997 | Stevenson et al. | 252/67 |
| 5,624,596 A * | 4/1997 | Lunger et al. | 252/68 |
| 5,626,790 A | 5/1997 | Minor | 252/67 |
| 5,672,293 A | 9/1997 | Minor et al. | 252/67 |
| 5,785,883 A | 7/1998 | Minor et al. | 252/67 |
| 6,106,740 A | 8/2000 | Powell et al. | 252/67 |
| 6,117,356 A | 9/2000 | Powell et al. | 252/67 |

FOREIGN PATENT DOCUMENTS

| | | | |
|---|---|---|---|
| DE | 41 16 274 C2 | 11/1992 | C09K/5/04 |
| EP | 0 430 169 B1 | 6/1991 | C09K/5/04 |

(List continued on next page.)

*Primary Examiner*—Yogendra N. Gupta
*Assistant Examiner*—Eisa Elhilo
(74) *Attorney, Agent, or Firm*—Beyer Weaver & Thomas LLP (57) ABSTRACT

A refrigerant composition comprising a hydrofluorocarbon component including 1,1,1,2-tetrafluoroethane (HCFC 134a), the composition further comprising an additive selected from a saturated hydrocarbon or mixture thereof boiling in the range −5 to +70° C.

20 Claims, 3 Drawing Sheets

FOREIGN PATENT DOCUMENTS

| | | | |
|---|---|---|---|
| EP | 0 430 169 A1 | 6/1991 | ............ C09K/5/04 |
| EP | 0 509 673 A1 | 10/1992 | ............ C09K/5/04 |
| EP | 0539 952 A1 * | 5/1993 | ............ C09K/5/04 |
| EP | 0 539 952 A1 | 5/1993 | ............ C09K/5/04 |
| EP | 0 608 164 A1 | 6/1995 | ............ A62B/35/04 |
| EP | 0 659 862 B1 | 6/1995 | ............ C09K/5/04 |
| EP | 0 659 862 A1 | 6/1995 | ............ C09K/5/04 |
| EP | 0 565 265 B1 | 10/1995 | ............ C09K/5/04 |
| EP | 0 720 639 B1 | 7/1996 | ............ C09K/5/04 |
| JP | 07173462 A2 | 7/1995 | |
| JP | 08143696 A2 | 6/1996 | |
| JP | 08170074 A2 | 7/1996 | |
| JP | 0408484 A2 | 1/1999 | |
| JP | 11-181414 | 7/1999 | ............ C09K/5/04 |
| WO | WO 92/11339 | 7/1992 | ............ C09K/5/04 |
| WO | WO 92/16597 | 10/1992 | ............ C09K/5/04 |
| WO | WO 94/26835 | 11/1994 | ............ C09K/5/04 |
| WO | WO 95/08602 | 3/1995 | ............ C09K/5/04 |
| WO | WO 96/03473 A1 | 2/1996 | ............ C09K/5/04 |
| WO | 9707179 A1 | 2/1997 | |
| WO | WO 97/15637 | 5/1997 | ............ C09K/5/04 |

* cited by examiner

R 22 REPLACEMENT REFRIGERANT

This is a continuation-in-part application of prior application Ser. No. 09/564,063 filed on May 3, 2000, now abandoned, which claims priority of Provisional Application No. 60/157,692 filed on Oct. 4, 1999.

This invention relates to a refrigerant particularly but not exclusively for air conditioning systems. The system relates especially to refrigerant compositions which have no adverse effect on the atmospheric ozone layer and to compositions which can be added to existing refrigerant which are compatible with lubricants commonly used in refrigeration and air conditioning systems. The invention also relates to a method of modifying refrigeration and air conditioning systems.

Chlorofluorocarbons (CFCs) eg CFC 11 and CFC 12 are stable, of low toxicity and non-flammable providing low hazard working conditions used in refrigeration and air conditioning systems. When released they permeate into the stratosphere and attack the ozone layer which protects the environment from damaging effects of ultraviolet rays. The Montreal Protocol, an International environmental agreement signed by over 160 countries, mandates the phase-out of CFCs according to an agreed timetable. This now includes hydrochlorofluorocarbons (HCFs) which also have an adverse effect on the ozone layer.

R 22 is a chemical fluid and by far the largest HCFC refrigerant used globally in refrigeration and air conditioning equipment. R 22 has an Ozone Depletion Potential (ODP) of approximately 5% of CFC 11. After CFCs have been phased out, the chlorine content of R 22 will make it the largest ozone depleting substance in volumetric terms. R 22 is also the subject of a phase-out schedule under the Montreal Protocol. R 22 is prohibited from use in new equipment in some countries.

Any replacement for HCFC 22 must have no ability to deplete ozone. The compositions of the present invention do not include chlorine atoms and consequently they will have no deleterious effect on the ozone layer while providing a similar performance as a working fluid to R 22 in refrigeration apparatus.

Various terms have been used in patent literature to describe refrigerant mixtures. These may be defined as follows:

Zeotrope: A fluid mixture whose vapour and liquid compositions are different at a specified temperature.

Temperature glide: If a zeotropic liquid is distilled at constant pressure its boiling point will increase. The change in boiling point from the beginning of the distillation until the point when a liquid phase has just disappeared is called the temperature glide. A glide is also observed when the saturated vapour of a zeotrope is condensed at constant pressure.

Azeotrope: A fluid mixture of specified compositions whose vapour and liquid compositions are the same at a specified temperature. Strictly speaking a fluid mixture which is an azeotrope under for example evaporator conditions, cannot also be an azeotrope under the condensor conditions. However the refrigeration literature may describe a mixture as azeotropic provided that it meets the above definition at some temperature within its working range.

Near-azeotropes: A blend which boils over a small temperature range, that has a small temperature glide.

Retrofit refrigerant mixture: A non-chlorine-containing mixture used to replace completely the original CFC or HCFC refrigerant.

Extender refrigerant mixture: A non-chlorine containing mixture added during servicing to the HCFC refrigerant remaining in a unit, that is a top up refrigerant to make good any leakage.

Hermetic compressor: A compressor where the electric motor is in the same totally welded casing as the compressor. The motor is coiled by the refrigerant vapour returning to the compressor. The heat generated by the motor is removed through the condensor.

Semi-hermetic compressor: Similar to a hermetic compressor, the major difference being the casing has a bolted joint which can be opened to enable the motor and compressor to be serviced.

Open compressor: A compressor which is driven by an external motor via a drive shaft passing through the compressor casing. The motor heat is dissipated directly to the environment, not via the condensor. This results in a slightly more efficient performance than a hermetic compressor, but refrigerant leaks can occur at the shaft seal.

Percentages and proportions referred to in this specification are by weight unless indicated otherwise. Percentages and proportions are selected to total 100%. HFC and HCFC refrigerant compounds are referred to below by the letter R.

According to a first aspect of the present invention a refrigerant composition comprises 1,1,1,2-tetrafluoroethane (R134a), pentafluoro ethane (R 125) and an additive selected from a saturated hydrocarbon or mixture thereof boiling in the range −5 to +70° C.; wherein the of weights of R 125 and R 134a are in the ranges:

| R125 | 50–80% |
| R134a | 50–20% |

The compositions may be used as retrofit refrigerant mixtures. The composition may also be used as extenders as discussed below. The compositions may be used in semi-hermetic and hermetic systems.

The preferred weights of R125 to R 134a are in the ranges:

| R125 | 60–80% |
| R134a | 40–20% |

A more preferred range is:

| R125 | 60–78% |
|------|--------|
| R134a | 40–22% |

A most preferred range is:

| R125 | 64–76% |
|------|--------|
| R134a | 34–24% |

These ranges are preferred for hermetic and semi-hermetic systems. The composition may also be used in an open system. The preferred weights in an open system are in the ranges:

| R125 | 57–78% |
|------|--------|
| R134a | 43–22%. |

A more preferred range is:

| R125 | 63–76% |
|------|--------|
| R134a | 33–24% |

The proportion of R 125 used in an open system may be up to 10%, preferably 4 to 5% higher than in a hermetic or semi-hermetic system.

In a first aspect of this invention no other refrigerant may be included in the mixture. In a second aspect, suitable for use as an R 22 extender, an additional refrigerant R 32 may be added.

Preferred hydrocarbons additives are selected from the group consisting of: 2-methylpropane, 2,2-dimethylpropane, butane, pentane, 2-methylbutane, cyclopentane, hexane, 2-methylpentane, 3-methylpentane, 2,2-dimethylbutane and methylcyclopentane. The hydrocarbon additive preferably has a boiling point in the range 20 to 40° C. Use of n-pentane, cyclopentane, iso-pentane and mixtures thereof is preferred. Use of n-pentane, isopentane or mixtures thereof is especially preferred. Commercially available saturated hydrocarbon mixtures are available from cyclopentane commercial grade from Phillips Petroleum International NV, Norpar $^P$5 S n-pentane from Exxon Chemical and iso-pentane Q1111 from Shell Chemicals.

Relative proportions of the pentane and butane components may be selected to give a total of 0.2% to 5% of the compositions, preferably 2 to 4%, more preferably 3 to 4%. An amount of pentane, preferably isopentane of 0.2 to 2% may be used together with a corresponding amount of 4.8 to 3% of butane in a composition containing a total of 5% hydrocarbon. In compositions with less than 5% hydrocarbon, for example 1% or 4%, relatively larger ratios of butane:pentane may be employed to minimise hydrocarbon build-up on leakage. Flammability risks are therefore reduced.

According to a second aspect of the present invention a refrigerant extender mixture comprises a composition in accordance with the first aspect of this invention.

According to a third aspect of this invention a refrigerant composition comprises a composition in accordance with the first aspect of this invention together with R 22. This invention also provides a method of modifying a refrigerator or air conditioning system incorporating R 22 as refrigerant, the method comprising the step of adding a composition in accordance with the second aspect of this invention to the refrigerant of the system.

Positive displacement compressors, that is reciprocating or rotary compressors, used in refrigeration systems suck in small amounts of lubricant from the crank case which are ejected with the refrigerant vapour through the exhaust valves. In order to maintain compressor lubrication this oil must be forced around the circuit by the refrigerant stream and returned to the crank case. CFC and HCFC refrigerants are miscible with hydrocarbon oils and hence carry the oils around the circuit. However HFC refrigerants and hydrocarbon lubricants have low mutual solubilities so effective oil return may not occur. The problem is particularly acute in evaporators where low temperatures can increase the viscosities of oils sufficiently to prevent them being carried along the tube walls. With CFCs and HCFCs enough refrigerant remains in the oil to reduce the viscosities to enable oil return to occur.

When using HFCs with hydrocarbon lubricants oil return can be facilitated by introducing into the system a hydrocarbon fluid having the following properties:

(a) sufficient solubility in the lubricant at the evaporator temperature to reduce its viscosity; and (b) sufficient volatility to allow distillation from the hot lubricated in the compressor crank case.

Hydrocarbons fulfill these requirements.

Refrigerant compositions in accordance with this invention confer several advantages. R 125 has fire suppressing characteristics. The presence of R 125 suppresses the flammability of the refrigerant mixture. The higher HFC content enables more n-pentane to be added to the mixture thereby improving the solubility properties of the mixture with traditional lubricants, for example mineral and alkyl benzene oils.

The present invention may confer a number of benefits in comparison to R 22 including zero ozone depletion, lower discharge temperature, and higher capacity.

The present invention may confer a number of benefits in comparison to the HFC replacement R407C including superior hydrocarbon oil return, better motor cooling in hermetic compressors, lower discharge temperature and lower discharge pressure.

The invention is further described by means of examples but not in any limitative sense.

EXAMPLE 1

The performances of five R125/R134a/pentane compositions were evaluated using standard refrigeration cycle analysis techniques in order to assess their suitability as retrofit replacements for R22 in hermetic or semi-hermetic systems. The operating conditions, used for the analyses were chosen as being typical of those conditions that are found in air conditioning systems. Since the blends were zeotropes the midpoints of their temperature glides in the evaporator and condenser were chosen to define the temperature limits of the cycle. The same temperatures were also used to generate performance data for R22.

The pentane was present at 4% by weight based on the total weight of the R125/R134a blend. To simplify the calculation this small amount of pentane was omitted.

The following refrigerant compositions were subjected to cycle analysis:

1. A composition comprising 44% R125: 56% R134a
2. A composition comprising 56% R125: 44% R134a
3. A composition comprising 64% R125: 36% R134a
4. A composition comprising 76% R125: 24% R134a
5. A composition comprising 80% R125: 20% R134a The following cycle conditions were used in the analysis:

| COOLING DUTY DELIVERED EVAPORATOR | 10 kW |
|---|---|
| Midpoint fluid evaporation temperature | 7.0° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° |
| Exhaust line pressure drop (in saturated temperature) | 1.5° C. |
| LIQUID LINE/SUCTION LINE HEAT EXCHANGER | |
| Efficient | 0.3 |
| COMPRESSOR | |
| Electric motor efficiency | 0.85 |
| Compressor isentropic efficiency | 0.7 |
| Compressor volumetric efficiency | 0.82 |
| PARASITIC POWER | |
| Indoor fan | 0.3 kW |
| Outdoor fan | 0.4 kW |
| Controls | 0.1 kW |

The results of analysing the performances in an air-conditioning unit using these operating conditions are shown in Table 1. For comparison the performance of R22 shown.

All compositions have lower exhaust temperatures than R22 and are therefore superior on this account. However compositions 5 is not preferred because the exhaust pressure is more than 2 bar above that of R22. Composition 1 is unacceptable because the refrigerant capacity is less than 90% of that of R22. The overall performances of compositions 2, 3 and 4 meet the criteria set out above and therefore satisfy the requirements of this invention.

EXAMPLE 2

The performances of five R125/R134a/pentane compositions were evaluated using standard refrigeration cycle analysis techniques in order to asses their suitability as retrofit replacements for R22 in open systems. The operating conditions, used for the analyses were chosen as being typical of those conditions that are found in air-conditioning systems. Since the blends were zeotropes the midpoints of their temperature glides in the evaporator and condenser were chose to define the temperature limits of the cycle. The same temperatures were also used to generate performance data for R22.

The pentane was present at 4% by weight based on the total weight of the R125/R134a blend. To simplify the calculation this small amount of pentane was omitted.

The following refrigerant compositions were subjected to cycle analysis:

1. A composition comprising 44% R125: 56% R134a
2. A composition comprising 56% R125: 44% R134a
3. A composition comprising 64% R125: 36% R134a
4. A composition comprising 76% R125: 24% R134a
5. A composition comprising 80% R125: 20% R134a The following cycle conditions were used in the analysis:

| COOLING DUTY EVAPORATOR | 10 kW |
|---|---|
| Midpoint fluid evaporation temperature | 7.0° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Exhaust line pressure drop (in saturated temperature) | 1.5° C. |
| LIQUID LINE/SUCTION LINE HEAT EXCHANGER | |
| Efficiency | 0.3 |
| COMPRESSOR | |
| Electric motor efficiency | 0.85 |
| Compressor isentropic efficiency | 0.7 |
| Compressor volumetric efficiency | 0.82 |
| PARASITIC POWER | |
| Indoor fan | 0.3 kW |
| Outdoor fan | 0.4 kW |
| Controls | 0.1 kW |

The results of analysing the performances in an air-conditioning unit using these operating conditions are shown in Table 2. For comparison the performance of R22 is also shown.

All compositions have lower exhaust temperatures than R22 and are therefore superior on this account. However composition 5 is unacceptable because its exhaust pressure is more than 2 bar above that of R22. Compositions 1 and 2 are unacceptable because their refrigerant capacities are less than 90% of that of R22. The overall performances of compositions 3 and 4 meet the criteria set out above and therefore satisfy the requirements of this invention.

EXAMPLE 3

The performances of five R125/R134a/pentane compositions were evaluated using standard refrigeration cycle analysis techniques the in order to assess their suitability as retrofit replacements for R22 in hermetic or semi-hermetic systems not fitted with a liquid line/suction line heat exchanger. The operating conditions, used for the analyses were chosen as being typical of those conditions that are found in air conditioning systems. Since the blends were zeotropes the midpoints of their temperature glides in the evaporator and condensor were chosen to define the temperature limits of the cycle. The same temperatures were also used to generate performance data for R22.

The pentane was present at 4% by weight based on the total weight of the R125/R134a blend. To simplify the calculation this small amount of pentane was omitted.

The following refrigerant compositions were subjected to cycle analysis:

1. A composition comprising 44% R125: 56% R134a
2. A composition comprising 56% R125: 44% R134a
3. A composition comprising 64% R125: 36% R134a
4. A composition comprising 76% R125: 24% R134a
5. A composition comprising 80% R125: 20% R134a The following cycle conditions were used in the analysis:

| COOLING DUTY EVAPORATOR | 10 kW |
|---|---|
| Midpoint fluid evaporation temperature | 7.0° C. |
| Superheating | 5.0° C. |
| Suction line pressure drop (in saturated temperate | 1.5° C. |
| CONDENSER | |
| Midpoint fluid condensing temperature | 45.0° C. |
| Subcooling | 5.0° C. |
| Exhaust line pressure drop (in saturated temperature) | 1.5° C. |
| COMPRESSOR | |
| Electric motor efficiency | 0.85 |
| Compressor isentropic efficiency | 0.7 |
| Compressor volumetric efficiency | 0.82 |
| PARASITIC POWER | |
| Indoor fan | 0.47 kW |
| Outdoor fan | 0.26 kW |
| Controls | 0.1 kW |

The results from analysing the performances in air-conditioning unit using these operating conditions are shown in Table 3. For comparison the performance of R22 is also shown.

All compositions have lower exhaust temperatures than R22 and are therefore superior on this account. However composition 5 is unacceptable because its exhaust pressure is more than 2 bar above that of R22. Compositions 1 and 2 are unacceptable because their refrigerant capacities are less than 90% of that of R22. The overall performances of compositions 3 and 4 meet the criteria set out above and therefore satisfy the requirements of this invention.

EXAMPLE 4

The performances of two R125/R134a/pentane compositions were evaluated using standard refrigeration cycle analysis techniques in order to assess their suitability as extenders for R22 in hermetic or semi-hermetic systems. The operating conditions selected for the analyses are typical of those conditions found in air conditioning systems. Since the blends were zeotropes the midpoints of their temperature glides in the evaporator and condenser were chosen to define the temperature limits of the cycle and were also used to generate the performance of R22 for comparison.

The pentane was present at 4% by weight based on the total weight of the R125/R134a blend. To simplify the calculation this small of pentane was omitted.

The following R22 extender compositions were subjected to cycle analysis:

1. A composition comprising 64% R125: 36% R134a.
2. A composition comprising 44% R125: 56% R134a.

Figure 1:
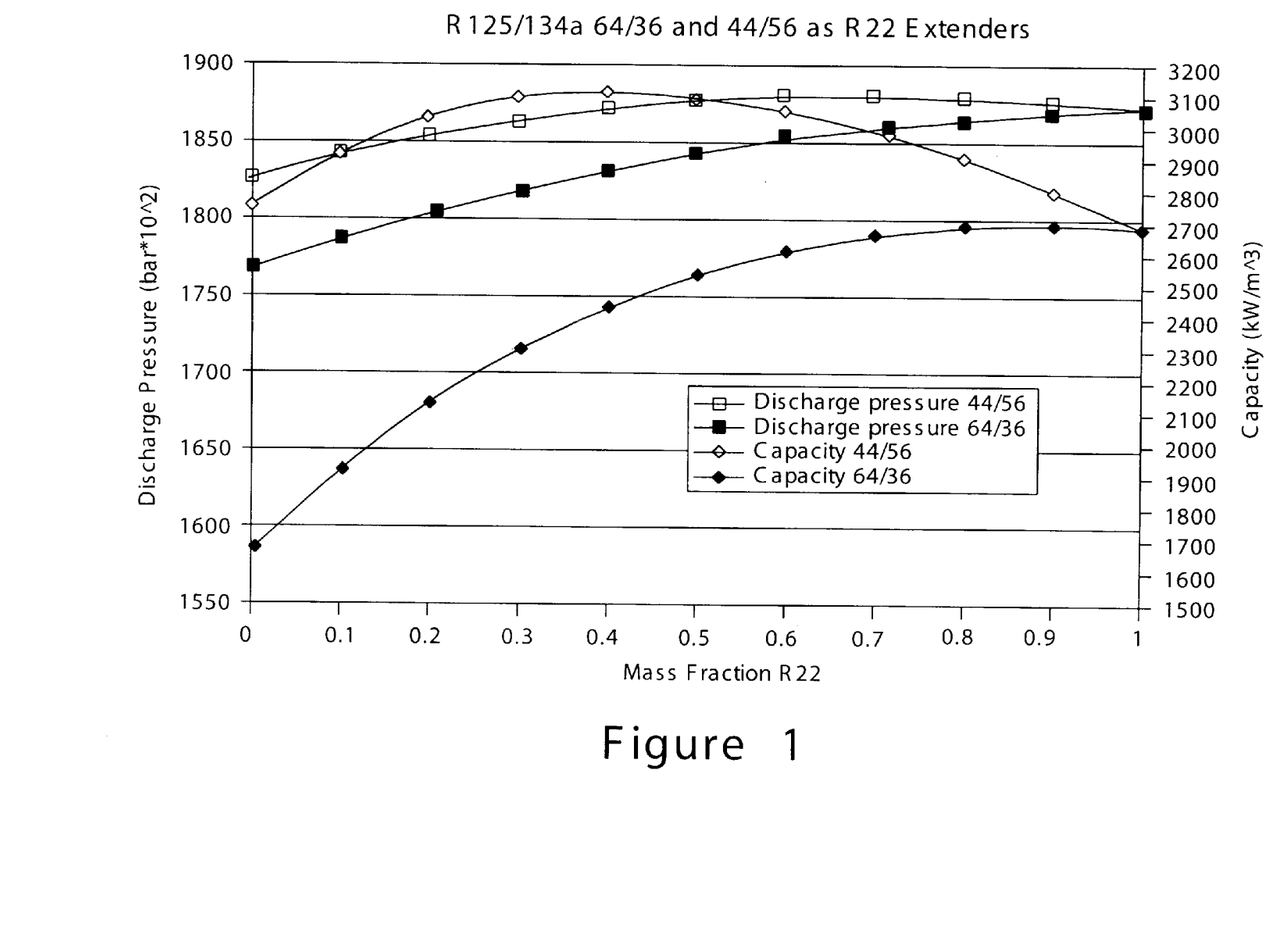
FIG. 1 illustrates a plot of R22 mass fraction vs. discharge pressure and capacity for the refrigerant composition data summarized in Tables 4a and 4b.

To establish the effects on unit performance resulting from successive dilutions of R22 by the above extenders the cycle was analysed for refrigerant compositions containing mass fractions of R22 from 1.0 down to 0.0. The results are summarised in Tables 4a and 4b. Key parameters are plotted in Chart 1 with the calculated points connected by smooth curves.

The following cycle conditions were used in the analysis:

| COOLING DUTY EVAPORATOR | 10 kW |
|---|---|
| Midpoint fluid evaporation temperature | 7.0° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Exhaust line pressure drop (in saturated temperature) | 1.5° C. |
| LIQUID LINE | |
| Electric motor efficiency | 0.85 |
| Compressor isentropic efficiency | 0.7 |
| Compressor volumetric efficiency | 0.82 |
| PARASITIC POWER | |
| Indoor fan | 0.3 kW |
| Outdoor fan | 0.4 kW |
| Controls | 0.1 kW |

All compositions have lower exhaust temperatures than R22 and are therefore superior on this account.

Composition 1 provides a cooling capacity greater than 90% of that of R22 over the whole of the dilution range. Blends containing more than 45% R22 have capacities equal to or better than that R22. The COP (system) is within 2% of that of R22 over the whole of the dilution range. This composition therefore meets the requirements of this invention.

Composition 2 provides a cooling capacity greater than that 90% of R22 for blends containing down to 20% of R22. Its COP (system) is essentially the same as that of R22 over the whole of the dilution range. This composition therefore meets the requirements of this invention for blends containing down to 20% R22.

EXAMPLE 5

An R32/R134a/pentane composition was evaluated using standard refrigeration cycle analysis techniques to assess its suitability as an extender for R22 in hermetic or semi-hermetic systems. The operating conditions selected for the analysis are typical of those conditions found in air conditioning systems. Since the blend was a zeotrope the midpoints of its temperature glides in the evaporator and condensor were chosen to define the temperature limits of the cycle. The same temperatures were also used to generate performance data for R22.

The pentane was present at 4% by weight based on the total weight of the R32/R134a blend. To simplify the calculation this small amount of pentane was omitted.

The following R22 extender composition was subjected to cycle analysis:

A composition comprising 44% R125 by weight, 56% by weight R134a.

Figure 2:
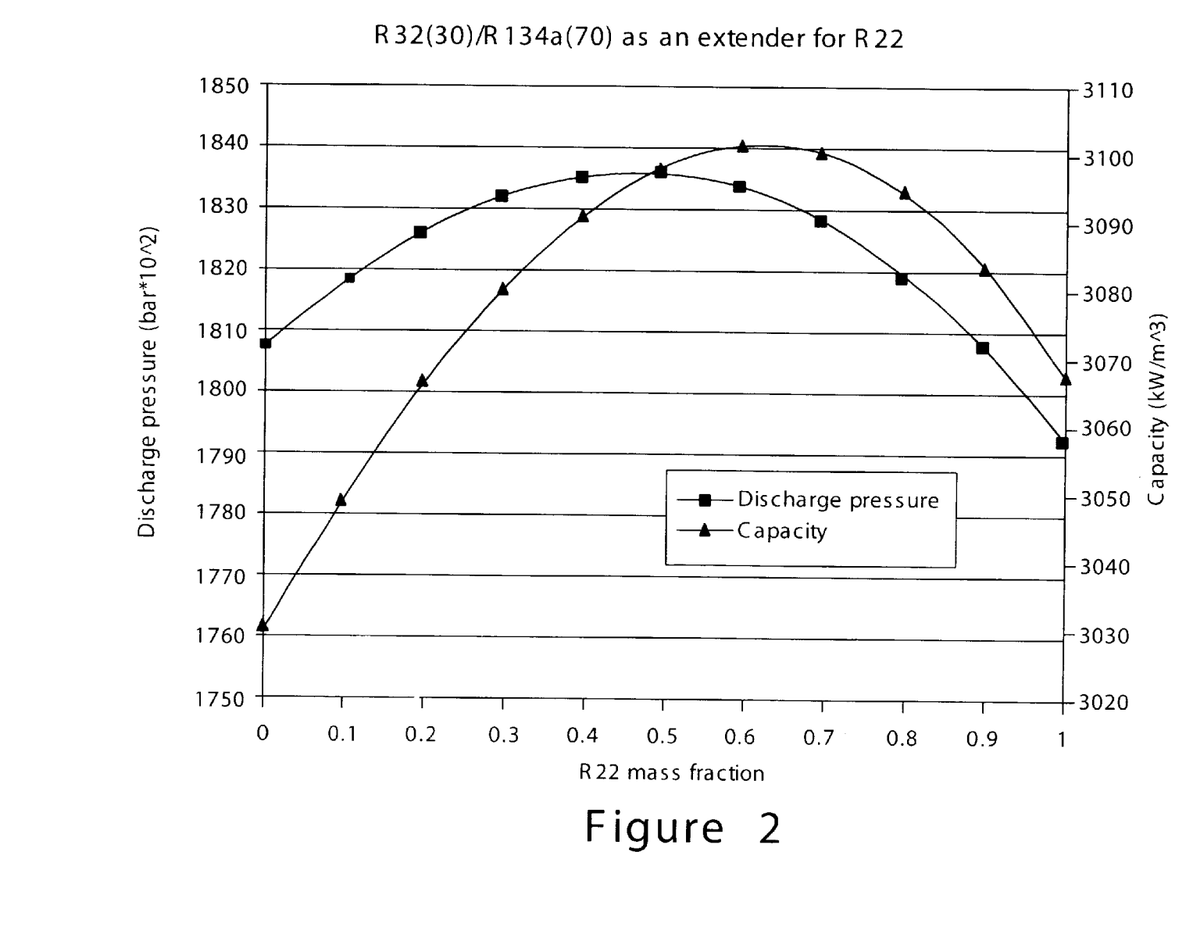
FIG. 2 illustrates a plot of R22 mass fraction vs. discharge pressure and capacity for the refrigerant composition data summarized in Table 5.

To establish the effect on unit performance resulting from successive dilutions of R22 by topping up with the above extender the cycle was analysed for refrigerant compositions containing mass fractions of R22 from 1.0 down to 0.0. The results are shown in Table 5 and the results plotted out in Chart 2 with the calculated points connected by smooth curves.

The following cycle conditions were used in the analysis:

| EVAPORATOR | |
|---|---|
| Midpoint fluid evaporation temperature | 7.0° C. |
| Superheating | 5.0° C. |
| Suction line pressure drop (in saturated temperature) | 1.5° C. |
| CONDENSER | |
| Midpoint fluid condensing temperature | 45.0° C. |
| Subcooling | 5.0° C. |
| Exhaust line pressure drop (in saturated temperature) | 1.5° C. |
| LIQUID LINE/SUCTION LINE HEAT EXCHANGER | |
| Efficiency | 0.3 |
| COMPRESSOR | |
| Electric motor efficiency | 0.85 |
| Compressor isentropic efficiency | 0.7 |
| Compressor volumetric efficiency | 0.82 |
| PARASITIC POWER | |
| Indoor fan | 0.3 kW |
| Outdoor fan | 0.4 kW |
| Controls | 0.1 kW |

All blends containing the extender have lower exhaust temperatures than R22 and therefore meet the requirements of this specification. The COP (system) is essentially equal to that of R22 over the whole of the dilution range. The cooling capacity of the refrigerant is not less than 98% of that of R22 over the whole of the dilution range. For dilutions down to 20% of R22 the capacity is equal to or greater than that of R22. The exhaust pressure is less than the 0.5 bar above that of R22 over the whole of the dilution range.

The results of analysing the performance of an air-conditioning unit using these operating conditions are shown in Table 5.

R32/R134a 30/70 therefore meets the requirements of this invention.

EXAMPLE 6

An R32/R125/R134a/pentane composition was evaluated using standard refrigeration cycle analysis techniques program to assess its suitability as an extender for R22 in hermetic or semi-hermetic systems. The operating conditions selected for the analysis are typical of those conditions found in air conditioning systems. Since the blend was zeotrope the midpoints of its temperature glides in the evaporator and condenser were chosen to define the temperature limits of the cycle. The same temperatures were also used to generate performance data for R22.

The pentane was present at 4% by weight based on the total weight of the R32/R134a blend.

To simplify the calculation this small amount of pentane was omitted.

The following R22 extender composition was subjected to cycle analysis:

A composition comprising 23% by weight of R 32, 25%R125 by weight and 52% by weight R134a.

Figure 3:
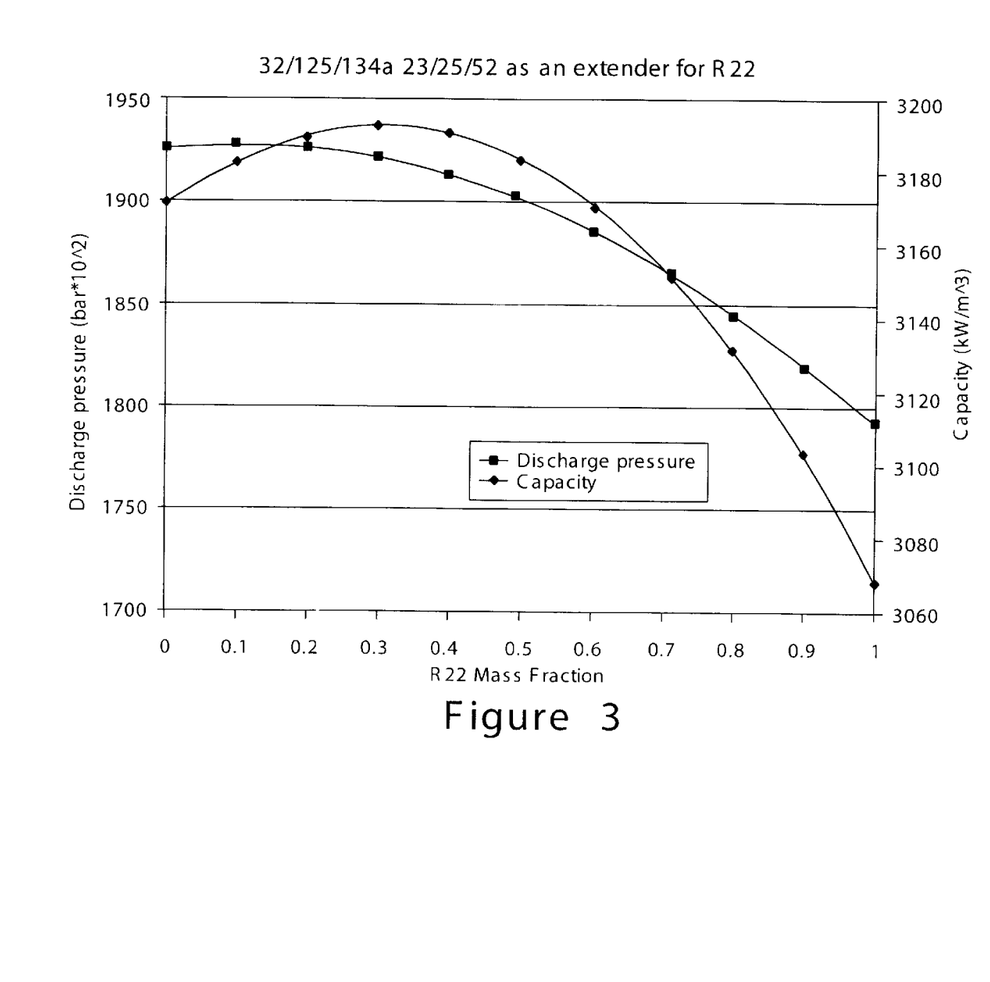
FIG. 3 illustrates a plot of R22 mass fraction vs. discharge pressure and capacity for the refrigerant composition data summarized in Table 6.

To establish the effect on unit performance resulting from successive dilutions of R22 by topping up with the above extender the cycle was analysed for refrigerant compositions containing mass fractions of R22 from 1.0 down to 0.0. The results are shown in Table 6 and the results plotted out in Chart 3 with the calculated points connected by smooth curves.

The following cycle conditions were used in the analysis:

| EVAPORATOR | |
|---|---|
| Midpoint fluid evaporation temperature | 7.0°C. |
| Superheating | 5.0°C. |
| Suction line pressure drop (in saturated temperature) | 1.5°C. |
| CONDENSER | |
| Midpoint fluid condensing temperature | 45.0°C. |
| Subcooling | 5.0°C. |
| Exhaust line pressure drop (in saturated temperature) | 1.5°C. |
| LIQUID LINE/SUCTION LINE HEAT EXCHANGER | |
| Efficiency | 0.3 |
| COMPRESSOR | |
| Electric motor efficiency | 0.8 |
| Compressor isentropic efficiency | 0.7 |
| Compressor volumetric efficiency | 0.82 |
| PARASITIC POWER | |
| Indoor fan | 0.3 |
| Outdoor fan | 0.4 kW |
| Controls | 0.1 kW |

The results of analysing the performance of an air-conditioning unit using these operating conditions are shown in Table 6.

All blends containing the extender have lower exhaust temperatures than R22 and therefore meet the requirements of this specification. The COP (system) in not less than 98% of that of R22 over the whole of the dilution range. The cooling capacity of the refrigerant is greater than of that of R22 over the whole of the dilution range. The exhaust pressure is less than the 2.0 bar above that of R22 over the whole of the dilution range.

R32/R134a in the ratio 30/70 therefore meets the requirements of this invention.

EXAMPLE 7

Refrigerant compositions comprising R 125, R 134a and hydrocarbon mixtures in commercial heat pump applications were assessed using a Comfort Aire model PHEC-60-1a 5 ton rooftop heat pump with a nominal cooling capacity of 56,000 btu and nominal heating capacity of 56,000 btu. An oil sight-glass was installed on the hermetic compressor and temperature sensors were installed on the suction and discharge lines and on the liquid line. Suction and discharge gauges were also installed.

The system was operated in both the cooling and heating mode with R 22 and the following data was recorded: voltage, amperage, suction pressure, suction temperature, discharge pressure, discharge temperature, liquid line temperature, evaporator temperature, ambient temperature, oil level and return supply air temperature. The R 22 charge was recovered and replaced successively with blends 1 to 6 of the following compositions.

| | R-125 | R-134a | Pentane | Isopentane | Butane |
|---|---|---|---|---|---|
| Blend #1 | 64% | 34% | 2% | | |
| Blend #2 | 70% | 28% | 2% | | |
| Blend #3 | 55% | 43% | 2% | | |

-continued

|  | R-125 | R-134a | Pentane | Isopentane | Butane |
|---|---|---|---|---|---|
| Blend #4 | 60.5% | 37.5% | 2% | | |
| Blend #5 | 45% | 52% | | 1% | 2% |
| Blend #6 | 55% | 42% | | 1% | 2% |

It was observed that oil return was similar to R 22 operating levels with all of the blends employed, indicating that pentane and isopentane/butane additives provided proper oil return. Some blends required addition of up to 20% refrigerant to prevent icing of the evaporator. Capacities were found to vary with the composition employed. The energy consumption was generally lower with all blends. Discharge pressures were slightly higher on average with blends that exceeded 60.5% R 125 and lower with blends containing less than 60.5% R 125. The suction pressures and discharge temperatures were lower with all blends used. The superheat measured at the evaporator outlet was much higher than R 22 and the temperature difference across the evaporator was generally greater in the cooling mode and less in the heating mode. It was noted that pentane and isopentane/butane additives provided the necessary oil return. Blends #3, 5 and 6 provided the closest similarities to R 22 operational temperatures and pressures.

TABLE 1

| Refrigerant % by weight | R-22 | 1. 125/134a 44/56 | 2. 125/134a 56/44 | 3. 125/134a 64/36 | 4. 125/134a 76/24 | 5. 125/134a 80/20 |
|---|---|---|---|---|---|---|
| Discharge pressure (bar) | 17.91 | 15.89 | 17.19 | 18.13 | 19.68 | 20.23 |
| Discharge temperature (° C.) | 104.68 | 79.75 | 78.51 | 77.60 | 76.07 | 75.51 |
| COP (system) | 2.49 | 2.50 | 2.47 | 2.45 | 2.41 | 2.40 |
| Capacity (kW/m$^3$) | 3066 | 2581 | 2747 | 2862 | 3041 | 3102 |
| Glide in evaporator (° C.) | 0 | 3.06 | 3.17 | 3.03 | 2.47 | 2.19 |
| Glide in condenser (° C.) | 0 | 2.97 | 2.94 | 2.71 | 2.09 | 1.81 |

TABLE 2

| Refrigerant % by weight | R-22 | 1. 125/134a 44/56 | 2. 125/134a 56/44 | 3. 125/134a 64/36 | 4. 125/134a 76/24 | 5. 125/134a 80/20 |
|---|---|---|---|---|---|---|
| Discharge pressure (bar) | 17.91 | 15.89 | 17.19 | 18.13 | 19.68 | 20.23 |
| Discharge temperature (° C.) | 92.9 | 72.8 | 71.9 | 71.2 | 70.1 | 69.7 |
| COP (system) | 2.59 | 2.57 | 2.54 | 2.52 | 2.48 | 2.47 |
| Capacity (kW/m$^3$) | 3222 | 2669 | 2838 | 2956 | 3138 | 3200 |
| Glide in evaporator (° C.) | 0 | 3.06 | 3.17 | 3.03 | 2.47 | 2.19 |
| Glide in condenser (° C.) | 0 | 2.97 | 2.94 | 2.71 | 2.09 | 1.81 |

TABLE 3

| Refrigerant % by weight | R-22 | 1. 125/134a 44/56 | 2. 125/134a 56/44 | 3. 125/134a 64/36 | 4. 125/134a 76/24 | 5. 125/134a 80/20 |
|---|---|---|---|---|---|---|
| Discharge pressure (bar) | 17.91 | 15.89 | 17.19 | 18.13 | 19.68 | 20.23 |
| Discharge temperature (° C.) | 94.63 | 71.81 | 70.63 | 69.71 | 68.082 | 67.47 |
| COP (system) | 2.45 | 2.42 | 2.39 | 2.37 | 2.33 | 2.36 |
| Capacity (kW/m$^3$) | 3077 | 2535 | 2692 | 2800 | 2965 | 3021 |
| Glide in evaporator (° C.) | 0 | 2.88 | 2.99 | 2.87 | 2.34 | 2.07 |
| Glide in condenser (° C.) | 0 | 2.97 | 2.94 | 2.71 | 2.09 | 1.81 |

TABLE 4a

R125/R134a 64%/36% as Extender for R22

| Refrigerant<br>% R22 by weight | 0 | 10 | 20 | 30 | 40 | 50 | 60 | 70 | 80 | 90 | 100 |
|---|---|---|---|---|---|---|---|---|---|---|---|
| Discharge pressure (bar) | 18.13 | 18.47 | 18.69 | 18.81 | 18.84 | 18.80 | 18.70 | 18.56 | 18.37 | 18.15 | 17.91 |
| Discharge temperature (° C.) | 77.6 | 79.7 | 81.8 | 84.0 | 86.4 | 89.0 | 91.7 | 94.6 | 97.8 | 101.1 | 104.7 |
| COP (system) | 2.45 | 2.45 | 2.46 | 2.46 | 2.47 | 2.47 | 2.48 | 2.48 | 2.49 | 2.49 | 2.49 |
| Capacity (kW/m$^3$) | 2852 | 2937 | 2996 | 3042 | 3074 | 3096 | 3107 | 3108 | 3101 | 3087 | 3069 |
| Glide in evaporator (° C.) | 3.03 | 2.91 | 2.66 | 2.36 | 2.04 | 1.73 | 1.41 | 1.08 | 0.75 | 0.39 | 0 |
| Glide in condenser (° C.) | 2.71 | 2.55 | 2.31 | 2.06 | 1.80 | 1.54 | 1.28 | 1.09 | 0.71 | 0.38 | 0 |

TABLE 4b

R125/R134a 44%/56% as Extender for R22

| Refrigerant<br>% R22 by weight | 0 | 10 | 20 | 30 | 40 | 50 | 60 | 70 | 80 | 90 | 100 |
|---|---|---|---|---|---|---|---|---|---|---|---|
| Discharge pressure (bar) | 15.90 | 16.41 | 16.83 | 17.17 | 17.44 | 17.64 | 17.79 | 17.88 | 17.93 | 17.93 | 17.91 |
| Discharge temperature (° C.) | 79.6 | 81.7 | 83.7 | 85.8 | 88.0 | 90.3 | 92.8 | 95.5 | 98.3 | 101.4 | 104.7 |
| COP (system) | 2.50 | 2.49 | 2.49 | 2.49 | 2.49 | 2.49 | 2.49 | 2.49 | 2.49 | 2.49 | 2.49 |
| Capacity (kW/m$^3$) | 2581 | 2675 | 2756 | 2825 | 2885 | 2935 | 2977 | 3010 | 3036 | 3054 | 3066 |
| Glide in evaporator (° C.) | 3.06 | 3.08 | 2.91 | 2.62 | 2.27 | 1.89 | 1.50 | 1.12 | 0.74 | 0.37 | 0 |
| Glide in condenser (° C.) | 2.97 | 2.89 | 2.66 | 2.36 | 2.02 | 1.69 | 1.34 | 1.00 | 0.67 | 0.34 | 0 |

TABLE 5

R32/134a 30%/70% as an Extender for R22

| Refrigerant<br>% R22 by weight | 0 | 10 | 20 | 30 | 40 | 50 | 60 | 70 | 80 | 90 | 100 |
|---|---|---|---|---|---|---|---|---|---|---|---|
| Discharge pressure (bar) | 18.08 | 18.18 | 18.27 | 18.33 | 18.36 | 18.36 | 18.34 | 18.28 | 18.19 | 18.07 | 17.91 |
| Discharge temperature (° C.) | 98.0 | 98.4 | 98.9 | 99.3 | 99.8 | 100.4 | 101.0 | 101.8 | 102.6 | 103.6 | 104.7 |
| COP (system) | 2.49 | 2.49 | 2.49 | 2.49 | 2.49 | 2.49 | 2.49 | 2.49 | 2.49 | 2.49 | 2.49 |
| Capacity (kW/m$^3$) | 3030 | 3049 | 3066 | 3080 | 3091 | 3098 | 3101 | 3100 | 3094 | 3083 | 3066 |
| Glide in evaporator (° C.) | 5.03 | 4.59 | 4.12 | 3.62 | 3.11 | 2.59 | 2.07 | 1.55 | 1.03 | 0.51 | 0 |
| Glide in condenser (° C.) | 5.13 | 4.62 | 4.11 | 3.60 | 3.08 | 2.57 | 2.07 | 1.56 | 1.06 | 0.54 | 0 |

TABLE 6

R32/125/134a 23/25/52 as an Extender for R22

| Refrigerant<br>% R22 by weight | 0 | 10 | 20 | 30 | 40 | 50 | 60 | 70 | 80 | 90 | 100 |
|---|---|---|---|---|---|---|---|---|---|---|---|
| Discharge pressure (bar) | 19.30 | 19.32 | 19.30 | 19.25 | 19.16 | 19.03 | 18.87 | 18.68 | 18.45 | 18.20 | 17.91 |
| Discharge temperature (° C.) | 92.5 | 93.3 | 94.1 | 95.0 | 96.0 | 97.1 | 98.4 | 99.7 | 101.2 | 102.9 | 104.7 |
| COP (system) | 2.47 | 2.47 | 2.47 | 2.47 | 2.47 | 2.48 | 2.48 | 2.48 | 2.49 | 2.49 | 2.49 |
| Capacity (kW/m$^3$) | 3172 | 3183 | 3190 | 3193 | 3191 | 3183 | 3171 | 3157 | 3129 | 3101 | 3066 |

TABLE 6-continued

R32/125/134a 23/25/52 as an Extender for R22

| Refrigerant % R22 by weight | 0 | 10 | 20 | 30 | 40 | 50 | 60 | 70 | 80 | 90 | 100 |
|---|---|---|---|---|---|---|---|---|---|---|---|
| Glide in evaporator (° C.) | 4.8 | 4.4 | 3.9 | 3.4 | 2.9 | 2.4 | 1.9 | 1.5 | 1.0 | 0.5 | 0 |
| Glide in condenser (° C.) | 4.7 | 4.2 | 3.8 | 3.3 | 2.8 | 2.4 | 1.9 | 1.5 | 1.0 | 0.5 | 0 |

TABLE 7

COMMERCIAL ROOF TOP HEAT PUMP 5 TON

| WT % COMPOSITION | R-22 | BLEND 1 64/34/2 | BLEND 2 70/28/2 | BLEND 3 55/43/2 | BLEND 4 60.5/37.5/2 | BLEND 5 45/52/1/2 | BLEND 6 55/42/1/2 |
|---|---|---|---|---|---|---|---|
| COOLING MODE | | | | | | | |
| ADDITIONAL REFR. REQ'D | | .9 KG | .9 KG | NONE | .9 KG | NONE | NONE |
| SUCTION PRESSURE | 4.48 | 3.5 | 3.37 | 3.03 | 3.45 | 2.69 | 3.1 |
| SUCTION TEMPERATURE | 18 | 22 | 19.4 | 27 | 20 | 22 | 21.7 |
| DISCHARGE PRESSURE | 13.1 | 13.5 | 13.17 | 12.68 | 12.42 | 11.25 | 12.42 |
| DISCHARGE TEMP. | 90 | 80 | 73 | 81 | 72 | 76 | 76 |
| LIQ. LINE TEMP. | 31 | 29 | 26 | 32 | 26 | 26 | 26 |
| AMBIENT TEMPERATURE | 22 | 24 | 21.7 | 26 | 21.2 | 22 | 22 |
| OIL LEVEL | 10.8 CM | 10.8 CM | 10.8 CM | 10.8 CM | 10.8 CM | 10.8 CM | 10.8 CM |
| AMPERAGE | 22.27 | 19.86 | 19.64 | 17.72 | 19.06 | 16.13 | 17.83 |
| VOLTAGE | 200 | 201 | 199 | 200 | 199 | 203 | 200 |
| EVAPORATOR TEMP. | 7.2 | 3.9 | 2.2 | 4 | 5 | 1.7 | 2.3 |
| AIR TEMP. DIFFERENCE | 12.2 | 17.7 | 16.1 | 19.7 | 14.4 | 17.3 | 16.1 |
| SUPERHEAT | 9.1 | 21 | 19.4 | 28 | 20 | 26 | 23.3 |
| HEATING MODE | | | | | | | |
| SUCTION PRESSURE | 4.82 | 4.97 | 4.9 | 3.6 | 4.69 | 3.45 | 3.72 |
| SUCTION TEMP. | 25 | 23 | 23 | 26 | 22 | 23 | 22 |
| DISCHARGE PRESSURE | 20.34 | 25.5 | 25.6 | 19.3 | 24 | 17.94 | 19.3 |
| DISCHARGE TEMP. | 120 | 98 | 98 | 95 | 94 | 91 | 91 |
| LIQ. LINE TEMP. | 32.2 | 30 | 30 | 32 | 29 | 27 | 26 |
| AMBIENT TEMP. | 24.2 | 24 | 22.2 | 25 | 22.4 | 22 | 20 |
| OIL LEVEL | 10.8 CM | 10.8 CM | 10.8 CM | 10.8 CM | 10.8 CM | 10.8 CM | 10.8 CM |
| AMPERAGE | 28.97 | 28.08 | 27.63 | 21.9 | 26.72 | 20.77 | 22.54 |
| VOLTAGE | 198 | 199 | 198 | 199 | 198 | 203 | 199 |
| EVAPORATOR TEMP. | 41 | 36.2 | 36.1 | 36.1 | 34 | 32 | 31 |
| AIR TEMP. DIFFERENCE | 11.1 | 7.8 | 7.8 | 6.3 | 7.6 | 7.2 | 7.5 |
| SUPERHEAT | NA | NA | NA | NA | NA | NA | NA |

Pressures are in bars gauge pressure
Temperatures are in celsius
All readings are averages over several hours of operation
Oil level measured in centimeters

We claim:

1. A refrigerant composition comprising 1,1,1,2-tetrafluoroethane (R 134a), pentafluoroethane (R 125) and an additive selected from a saturated hydrocarbon or mixture thereof boiling in the range −5 to +70° C., wherein the weights of R 125 to R 134a are in the ranges:

| R 125 | 50–80% |
|---|---|
| R 134a | 50–20%. |

2. A refrigerant composition as claimed in claim 1, wherein the weights are in the ranges:

| R 125 | 60–80% |
|---|---|
| R 134a | 40–20%. |

3. A refrigerant composition as claimed in claim 2, wherein the weights are in the ranges:

| R 125 | 60–78% |
|---|---|
| R 134a | 40–22%. |

4. A refrigerant composition as claimed in claim 3, wherein the weights are in the ranges:

| R 125 | 64–76% |
|---|---|
| R 134a | 36–24%. |

5. A refrigerant composition as claimed in claim 1, wherein the weights are in the ranges:

| | |
|---|---|
| R 125 | 57–78% |
| R 134a | 43–22%. |

6. A refrigerant composition as claimed in claim 5, wherein the weights are in the ranges:

| | |
|---|---|
| R 125 | 63–76% |
| R 134a | 37–24%. |

7. A refrigerant composition as claimed in claim 1, wherein the hydrocarbon additive is selected from the group consisting of 2-methylpropane, 2,2-dimethylpropane, butane, pentane, 2-methylbutane, cyclopentane, hexane, 2-methylpentane, 3-methylpentane, 2,2-dimethylbutane, methylcyclopentane and mixtures thereof.

8. A refrigerant composition as claimed in claim 1, wherein the hydrocarbon additive has a boiling point in the range of 20 to 40° C.

9. A refrigerant composition as claimed in claim 8, wherein the hydrocarbon additive is selected from the group consisting of n-pentane, cyclopentane, iso-pentane and mixtures thereof.

10. A refrigerant composition as claimed in claim 9, wherein the hydrocarbon additive is n-pentane.

11. A refrigerant composition as claimed in claim 9, wherein the additive further comprises butane.

12. A refrigerant compositions as claimed in claim 11, wherein the ratio of pentane:butane is 1:3 to 1:8.

13. A refrigerant composition as claimed in claim 1, wherein the amount of hydrocarbon additive is up to 10%.

14. A refrigerant composition as claimed in claim 13, wherein the amount of hydrocarbon additive is 1 to 8%.

15. A refrigerant composition as claimed in claim 14, wherein the amount of hydrocarbon additive is 2 to 4%.

16. A refrigerant composition as claimed in claim 1, further comprising up to 30% chlorodifluoromethane (R 22).

17. A refrigerant extender mixture comprising a refrigerant composition as claimed in claim 1.

18. A method of modifying a refrigerator or air conditioning system which incorporates R 22 as refrigerant, the method comprising the step of adding a refrigerant extender as claimed in claim 17 to the refrigerant of the system.

19. A method of extending R 22 refrigerant in a refrigeration or air conditioning device, comprising:
adding to an R 22 refrigerant in a refrigeration or air conditioning device a refrigerant composition having a hydrofluorocarbon component comprising difluoromethane (R 32), R 125 and R 134a, wherein the ratio of weights of R 32, R 125 and R 134a are in the ranges:

| | |
|---|---|
| R 32 | 18–28% |
| R 125 | 20–30% |
| R 134a | 42–62%. |

20. A refrigerant composition as claimed in claim 12, wherein the ratio of pentane:butane is 1:5.

* * * * *